B. J. X. GOSSELIN.
ASTRONOMICAL REFLECTING INSTRUMENT FOR THE MEASUREMENT OF ANGLES.
APPLICATION FILED JUNE 18, 1917.
1,319,954.
Patented Oct. 28, 1919.
2 SHEETS—SHEET 1.
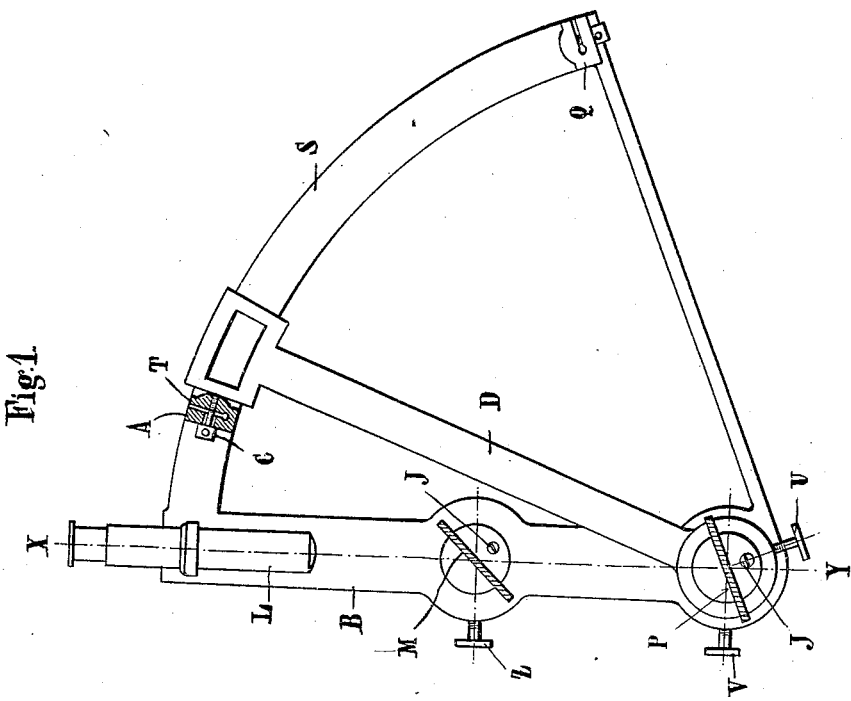
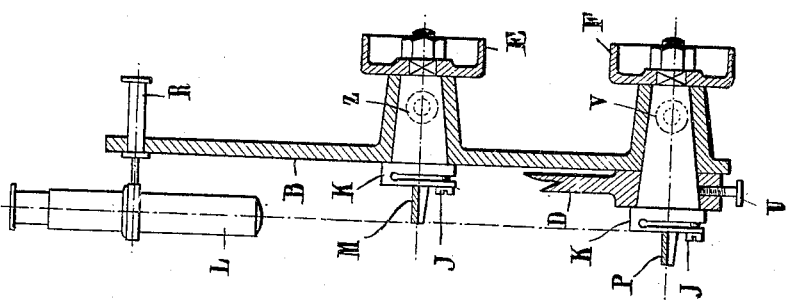
INVENTOR
Benoit J. X. Gosselin
BY
ATTORNEY B. J. X. GOSSELIN.
ASTRONOMICAL REFLECTING INSTRUMENT FOR THE MEASUREMENT OF ANGLES.
APPLICATION FILED JUNE 18, 1917.

1,319,954.

Patented Oct. 28, 1919.
2 SHEETS—SHEET 2.

INVENTOR
Benoit J. X. Gosselin
BY
*[signature]*
ATTORNEY.

UNITED STATES PATENT OFFICE.

BENOIT JOSEPH XAVIER GOSSELIN, OF SAN SEBASTIAN, SPAIN.

ASTRONOMICAL REFLECTING INSTRUMENT FOR THE MEASUREMENT OF ANGLES.

1,319,954.   Specification of Letters Patent.   Patented Oct. 28, 1919.

Application filed June 18, 1917. Serial No. 175,343.

*To all whom it may concern:*

Be it known that I, BENOIT JOSEPH XAVIER GOSSELIN, a subject of Great Britain, resident of San Sebastian, Spain, (post-office address 2 Plaza de Alfonso XIII), have invented a new and useful Improvement in or Relating to Astronomical Reflecting Instruments for the Measurement of Angles, which improvements are fully set forth in the following specification.

This invention relates to astronomical reflecting instruments for the measurement of angular distances, the type of instrument referred to being that wherein a measurement of an angle subtended at the observer's position by two distant objects is made by bringing two images, one of each object, by means of adjustable reflecting mirrors, into apparent coincidence with one another, and ascertaining the value of the angle to be measured from the actual position occupied by the mirrors, when the images of the two objects have been brought into coincidence.

Many forms of reflecting instruments for measuring angles such as sextants or other similar astronomical reflecting instruments, have the drawback that only angles less than 120° can be measured thereby, owing to the obliquity of the reflections and the loss of light in the images.

The apparatus forming the subject matter of the present invention enables any angle from 0 to 360° to be measured, without the angle of incidence of the rays with the normal to the mirrors ever becoming greater, if desired, than 45° in the least favorable case.

In a sextant or other similar astronomical reflecting instrument, the graduated limb or arc must be equal to half the greatest angle to be measured. In the apparatus forming the subject-matter of the present invention, the arc may be reduced at will to any length; for example, any angle from zero to 360° can be measured by means of a divided arc of 45°.

The apparatus provided by the present invention has the further advantage over a sextant that all observations made by it can be made conveniently, without having to hold it in an inconvenient position even when taking a measurement in the neighborhood of the zenith. Moreover, the apparatus enables the use of numerous new methods of observation, which cannot be carried out with the sextant or other similar astronomical reflecting apparatus hitherto in use.

The present invention provides, in an instrument of the type above defined, the combination of a telescope, a graduated arc, an alidade, and two mirrors mounted each on an axis of rotation situated in the field of view of the telescope, both mirrors being rotatable respectively to one another and also respectively to the frame of the graduated arc supporting them, each axis being set perpendicular to the plane of the arc and being provided at the end opposite to the mirror with a handwheel for producing the rotation of the said mirror.

One of these mirrors is rotatably adjustable on the frame of the arc by means of the hand-wheel while the other is so disposed as to be rotatable separately, either by its hand-wheel or by means of the alidade, so that the image of one object, seen in this mirror can be alined with the image of another object seen in the other mirror kept stationary.

The alidade, the graduated arc and the mirrors are so arranged as to allow the measurement on the arc of the angle existing at any time between the reflecting planes of the two mirrors.

The graduated arc is provided with two convenient stops to restrict the range of movement of the alidade to a predetermined angle, and provision is made for the alidade of connecting and disconnecting it from the means whereby it is rotatably adjusted to produce the coincidence of the images; by which provision it becomes possible, when necessary, to give to the mirror a rotation of a predetermined angle in the convenient direction to bring the value of the angle between the reflecting planes of the two mirrors within the limits directly measurable by the divided arc.

The present invention is further described with reference to the accompanying drawings in which:—

Figure 1 is a plan and Fig. 2 a section on the line X—Y of Fig. 1 of one form of an instrument constructed according to this invention.

Figure 3:
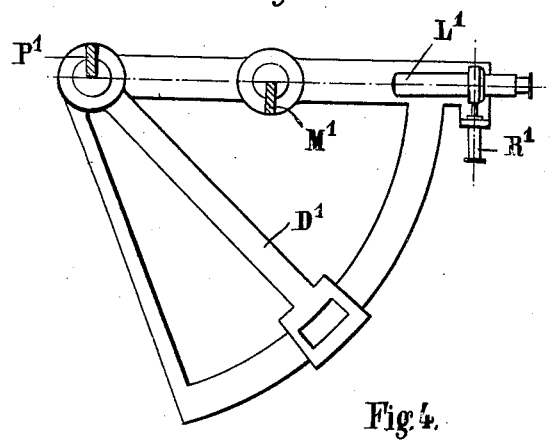
Fig. 3 is a plan of a modification.

The instrument seen in Figs. 1 and 2 consists of a frame B to which is connected a graduated limb or arc S, as shown in Fig. 1 which represents the projection of the apparatus on a plane parallel to the plane of the arc.

Upon the frame B two mirrors M and P are mounted to rotate about axes of rotation perpendicular to the plane of the arc S. A telescope L is arranged so that its axis of collimation is parallel to the plane of the arc and passes through the axes of rotation of the mirrors M and P which are mounted at different levels above the arc so that each occupies a part of the field of the telescope.

An adjusting screw R enables the level of the telescope above the limb to be varied.

The mirror M is mounted on an axis provided with a milled hand-wheel E by which it may be rotated and a clamping screw Z is provided to clamp it in any desired position. The mirror P is similarly mounted and provided with an operating hand-wheel F and clamping screw V. The axis of the mirror P is further constructed so as to be clamped by a clamping screw U to an alidade or arm D, whose outer end traverses the curved limb S which is concentric with the axis of rotation of the mirror P.

In order conveniently to add or subtract a given angle to or from the angle formed by the reflecting planes of the mirrors, the angular travel of the alidade is limited at its two ends by two micrometrically adjustable stops Q and T (Fig. 1), each formed as seen at A and T in Fig. 1.

The rear part A of the stop is secured to the arc S and a screw C is used to draw back at will the part T which extends resiliently from the part A and forms an abutment for the alidade, thereby enabling a strict regulation of the magnitude of the angle added by a complete traverse of the alidade.

Incidentally it will be noticed that each of the mirrors is mounted on its respective axis by means of a metallic platform supported by a resilient joint K forming a spring (Fig. 2) so that the reflecting plane of the mirror can be rendered perpendicular to the plane of the arc S by merely tightening or loosening the screw J arranged at the rear of the mirrors, as will readily be understood.

When taking a measurement of the angle subtended at the observer's position by the apparent distance separating two distant objects, the mirrors M and P are adjusted, each by its hand-wheel, until the images of the two objects are seen simultaneously in the field of the telescope and are in alinement with one another. When the alinement of the images has been obtained, the angle between the reflecting surfaces of the mirrors is half that of the said angle subtended by the two objects. The angle between the mirrors is determined by measuring on the arc S the angle through which the mirror P must be rotated to bring it into parallelism with the mirror M, the point of parallelism being easily noted by viewing a very distant object through the telescope and both mirrors and observing when the two images of that object are in alinement. If the angle between the mirrors, before they are brought into parallelism, is less than that of the graduated arc S, the operation is simply performed by clamping the mirror P to the alidade by means of the screw U and moving the alidade until the mirrors are parallel with one another, the said mirror being rotated by the movement of the alidade, as will be understood.

If the angle between the mirrors is greater than the arc S, it is measured step by step by rotating the mirror P a sufficient number of times through an angle equal to the whole extent of the arc S plus a small portion of such arc, if any, as may be necessary to bring about the desired parallelism. The said step by step movements of the mirror P are made in the following way: The screw U is left free and the screw V clamped and the alidade is moved to that extreme end of the arc S which will allow the alidade to then carry the mirror P in the desired direction. The screw U is then tightened and the screw V loosened and the alidade moved to the other end of the arc S, after which the screw V is tightened and the screw U loosened, and the operation repeated a sufficient number of times to bring the mirror P very nearly parallel with M; complete parallelism is obtained by a final short movement of the alidade. Thus, if the angle between the reflecting planes of the mirrors is 102° and the graduated arc is only 45°, the mirror P will be clamped to the alidade previously set to the convenient extreme end of the arc, say for instance the end lettered O. Then a complete stroke of the alidade, turning the mirror P in the corresponding direction, will bring the angle between the mirrors to be 102°−45°=57°. The mirror P is then clamped to the frame and unclamped from the alidade and the latter is carried back alone to the zero end of the arc. The mirror P is then again clamped to the alidade, which is again moved a complete stroke in the same direction as before, turning the mirror P. This will bring the angle between the mirrors to be 57°−45°=12°. The mirror P is then unclamped from the alidade and clamped to the frame, and the alidade alone is again brought to zero position on the arc. The mirror is then unclamped from the frame and clamped again to the alidade. The instrument is now directed to observe a far distant object, the images of which, obtained in each mirror, are caused to coincide in the telescope by conveniently rotating the mirror P by means of the alidade. The final position of the alidade on the graduated arc, when the two images coincide, will give the reading of the angle 12°, to which must be added twice the predetermined angle of 45°, giving for the angle required the total 102°. The angle between the two objects will then be twice 102° that is 204°.

Fig. 3 represents a modification of the arrangement of the mirrors. In this case, the field of the telescope is divided between the mirrors by a plane perpendicular to the limb, the dividing line being the axis of rotation of the mirrors. The device R for adjusting the height of the telescope, indicated in Fig. 2, must be replaced by a device R' which adjusts it in a direction parallel to the limb, (Fig. 3).

Figure 4:
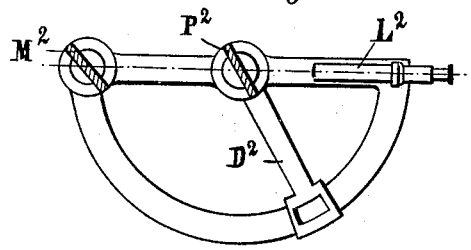
Figs. 4 and 5 are plans of further modifications.

Fig. 4 represents a different construction of the invention applying to an instrument of small dimensions. The reduced proportions of the apparatus permit a graduated limb whose arc is 180° to be employed without any inconvenience, in which case it is not absolutely necessary to render the alidade $D^2$ accumulative, since, in that case, the angle between the mirrors $M^2$, $P^2$, will always be less than the arc of the limb.

Figure 5:
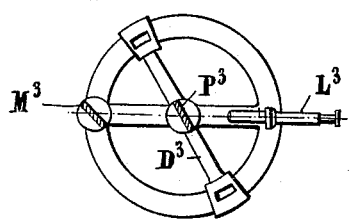

Fig. 5 represents a complete circle with a double alidade $D^3$ which enables the errors due to the eccentricity of the division circle, with reference to the center of rotation of the alidade, to be corrected.

Having now particularly described and ascertained the nature of my said invention and in what manner the same is to be performed, I declare that what I claim is:

1. In an instrument for measuring the angular distance between two distant objects, the combination of a frame; a pair of object-mirrors mounted on said frame to rotate about parallel axes; a telescope mounted on said frame with its axis of collimation passing through the axes of the mirrors; said mirrors being rotatable independently of and relatively to each other to bring the images of the objects into alinement in the field of vision of the telescope; and means for repeatedly rotating one mirror through a predetermined angle about its axis in addition to and independently of its said rotary alining movement.

2. In an instrument for measuring the angular distance between two distant objects, the combination of a frame; a pair of object-mirrors mounted on said frame to rotate about parallel axes; a telescope mounted on said frame with its axis of collimation passing through the axes of the mirrors; said mirrors being rotatable independently of and relatively to each other to bring the images of the objects into alinement in the field of vision of the telescope; and a swinging member mounted on said frame and connectible to and disconnectible from one mirror for repeatedly rotating it through a predetermined angle about its axis in addition to and independently of its said rotary alining movement.

3. In an instrument for measuring the angular distance between two distant objects, the combination of a frame comprising an arcuate, graduated limb; a pair of object-mirrors mounted on said frame to rotate about parallel axes which are perpendicular to the plane of said limb; a telescope mounted on said frame with its axis of collimation parallel to the plane of said limb and passing through the axes of the mirrors; said mirrors being rotatable independently of and relatively to each other to bring the images of the objects into alinement in the field of vision of the telescope; and means slidably engaging said limb and connectible to one mirror for rotating it about its axis independently of its said rotary alining movement.

4. In an instrument for measuring the angular distance between two distant objects, the combination of a frame comprising an arcuate, graduated limb; a pair of object-mirrors mounted on said frame to rotate about parallel axes which are perpendicular to the plane of said limb; a telescope mounted on said frame with its axis of collimation parallel to the plane of said limb and passing through the axes of the mirrors; said mirrors being rotatable independently of and relatively to each other to bring the images of the objects into alinement in the field of vision of the telescope; means slidably engaging said limb and connectible to one mirror for rotating it about its axis independently of its said rotary alining movement; and means to restrict the movements of said slidable means in opposite directions within predetermined limits.

5. In an instrument for measuring the angular distance between two distant objects, the combination of a frame comprising an arcuate, graduated limb; a pair of object-mirrors mounted on said frame to rotate about parallel axes which are perpendicular to the plane of said limb; a telescope mounted on said frame with its axis of collimation parallel to the plane of said limb and passing through the axes of the mirrors; said mirrors being rotatable independently of and relatively to each other to bring the images of the objects into alinement in the field of vision of the telescope; means slidably engaging said limb and connectible to one mirror for rotating it about its axis independently of its said rotary alining movement; and stops on said limb adjacent its opposite ends for restricting the movements of said slidable means in opposite directions within predetermined limits; said stops having micrometrically-adjustable portions.

6. In an instrument for measuring the angular distance between two distant objects, the combination of a frame; a pair of object-mirrors mounted on said frame to rotate about parallel axes; a telescope mounted on said frame with its axis of collimation passing through the axes of the mirrors; said mirrors being rotatable independently of and relatively to each other to bring the images of the objects into alinement in the field of vision of the telescope; a swinging member mounted on said frame; and means for releasably clamping one mirror to said member to rotate about its axis independently of its rotary alining movement during the swinging movements of said member.

7. In an instrument for measuring the angular distance between two distant objects, the combination of a frame; a pair of object-mirrors mounted on said frame to rotate about parallel axes; a telescope mounted on said frame with its axis of collimation passing through the axes of the mirrors; said mirrors being rotatable independently of and relatively to each other to bring the images of the objects into alinement in the field of vision of the telescope; a swinging member mounted on said frame; means for releasably clamping one mirror to said member to repeatedly rotate about its axis through a predetermined angle in addition to and independently of its said rotary alining movement; and means for clamping said mirror to said frame when released from the first-named clamping means.

8. In an instrument for measuring the angular distance between two distant objects, the combination of a frame; a pair of object-mirrors mounted on said frame to rotate about parallel axes; a telescope mounted on said frame with its axis of collimation passing through the axes of the mirrors; said mirrors being rotatable independently of and relatively to each other to bring the images of the objects into alinement in the field of vision of the telescope; a swinging member mounted on said frame; means for releasably clamping one mirror to said member to repeatedly rotate about its axis through a predetermined angle in addition to and independently of its said rotary alining movement; and stops for restricting the movements of said member in opposite directions within predetermined limits which constitute said angle.

9. In an instrument for measuring the angular distance between two distant objects, the combination of a frame; a pair of object-mirrors mounted on said frame to rotate about parallel axes; a telescope mounted on said frame with its axis of collimation passing through the axes of the mirrors; said mirrors being rotatable independently of and relatively to each other to bring the images of the objects into alinement in the field of vision of the telescope; a swinging member mounted on said frame; means for releasably clamping one mirror to said member to repeatedly rotate about its axis through a predetermined angle in addition to and independently of its said rotary alining movement; stops for restricting the movements of said member in opposite directions within predetermined limits which constitute said angle; and means for clamping said member to said frame when released from the first-named clamping means.

In testimony whereof I have signed this specification in the presence of two subscribing witnesses.

BENOIT JOSEPH XAVIER GOSSELIN.

Witnesses:
C. INNESS BROWN,
ANGEL ESCUDERO.